United States Patent
Farbar et al.

(10) Patent No.: US 12,525,627 B2
(45) Date of Patent: Jan. 13, 2026

(54) FUEL CELL SYSTEM AND FUEL DELIVERY SYSTEM THEREFOR

(71) Applicant: GM GLOBAL TECHNOLOGY OPERATIONS LLC, Detroit, MI (US)

(72) Inventors: Erin Farbar, LaSalle (CA); Devesh Pande, Lake Orion, MI (US); Timothy J. Howitt, Oxford, MI (US); Dean Kostadinovski, Shelby Township, MI (US); Ronald Miller, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 599 days.

(21) Appl. No.: 18/166,070

(22) Filed: Feb. 8, 2023

(65) Prior Publication Data
US 2024/0266562 A1    Aug. 8, 2024

(51) Int. Cl.
*H01M 8/04119* (2016.01)
*H01M 8/04746* (2016.01)
*H01M 8/04858* (2016.01)

(52) U.S. Cl.
CPC ... *H01M 8/04119* (2013.01); *H01M 8/04753* (2013.01); *H01M 8/0494* (2013.01)

(58) Field of Classification Search
None
See application file for complete search history.

(56) References Cited

U.S. PATENT DOCUMENTS

| | | | |
|---|---|---|---|
| 8,241,808 B2* | 8/2012 | Kobayashi | H01M 8/04097 429/513 |
| 2003/0148167 A1* | 8/2003 | Sugawara | H01M 8/04097 429/415 |
| 2016/0146097 A1* | 5/2016 | Ge | F02B 37/013 60/273 |
| 2020/0274179 A1* | 8/2020 | Yoshitomi | H01M 8/0687 |
| 2023/0112688 A1* | 4/2023 | Komori | G06V 20/58 701/45 |

FOREIGN PATENT DOCUMENTS

JP    2021068531 A  *  4/2021

* cited by examiner

*Primary Examiner* — Alix E Eggerding
(74) *Attorney, Agent, or Firm* — Quinn IP Law (57) ABSTRACT

A fuel cell system arranged to supply electric power to an actuator via an electric power circuit includes an anode and a cathode. A hydrogen delivery system is arranged to supply pressurized hydrogen to the anode, and has a jet pump including an injector nozzle and an ejector. The jet pump channels pressurized hydrogen from a hydrogen tank to the fuel cell. The ejector includes a venturi tube, a mixing chamber, and a secondary flow element, wherein the secondary flow element includes a first duct and a bypass duct. The venturi tube has a first fluidic inlet that is proximal to the injector nozzle, and a second fluidic inlet that is downstream from the injector nozzle of the venturi tube. The first duct is fluidly coupled to the first fluidic inlet, and the bypass duct is fluidly coupled to the second fluidic inlet of the venturi tube.

20 Claims, 5 Drawing Sheets

FUEL CELL SYSTEM AND FUEL DELIVERY SYSTEM THEREFOR

INTRODUCTION

A fuel cell is an electrochemical device that converts chemical energy of a fuel, e.g., hydrogen, into electrical power by an electro-chemical reaction. The fuel cell includes an anode, a cathode, and an electrolyte that is disposed between the anode and the cathode, and a fuel delivery system that supplies the fuel, e.g., hydrogen to the anode. During operation, fuel, such as hydrogen gas, may enter the anode, and oxygen or air may enter the cathode. The hydrogen gas may dissociate in the anode to generate free hydrogen protons and electrons. The hydrogen protons may then pass through the electrolyte to the cathode, and react with oxygen and electrons in the cathode to generate water. Further, the electrons from the anode may instead be directed through an electrical load to perform work by transforming the electrical power to mechanical power. Multiple fuel cells may be combined to form a fuel cell stack to generate a desired fuel cell power output. For example, a fuel cell for a vehicle may include many stacked fuel cells. One type of fuel cell includes a polymer electrolyte membrane fuel cell (PEMFC).

Current fuel cell systems may include a device having a duct that introduces secondary or recycled fuel into the fuel delivery system.

In operation, unspent fuel from operation of a fuel cell may be recycled and re-introduced into the fuel delivery system for the fuel cell, referred to as entrainment. Systems for entrainment are characterized based upon some quantifiable measure of primary fuel flow from a fuel source and secondary fuel flow that is recycled from the fuel cell. In one embodiment, entrainment may be characterized as a ratio of the secondary fuel flow in relation to the primary fuel flow. Present methods and systems for improving entrainment efficiency of ejectors have been focused on reducing flow restriction in a secondary duct by removing elbows, straightening pipes, etc., which may result in undesirable increases in packaging space.

SUMMARY

The concepts described herein provide a fuel cell system and a fuel delivery system for a fuel cell system that increase, optimize, or otherwise improve entrainment of secondary fuel flow that is recycled from a fuel cell by increasing fuel flow area, reducing flow restrictions and employing other devices and flow management techniques, while also accounting for factors related to packaging. This includes reducing flow restrictions without increasing packaging space.

In one embodiment, the concepts provide a fuel recycling element having a first duct and a bypass duct, which enable improved recycling of unused fuel from the anode to the ejector and increase overall entrainment efficiency of the ejector. In one embodiment, the fuel being employed by the fuel cell system is hydrogen, although the concepts described herein are not so limited.

A fuel cell system arranged to supply electric power to an actuator via an electric power circuit is described, and includes an anode and a cathode. A hydrogen delivery system is arranged to supply pressurized hydrogen to the anode of the fuel cell, and includes a multi-injector system including a plurality of hydrogen injectors.

An aspect of the disclosure may include an embodiment of the hydrogen delivery system being a jet pump including an injector nozzle and an ejector, wherein the jet pump is fluidly connected to the fuel cell stack. The jet pump channels pressurized hydrogen from a hydrogen tank to the fuel cell stack. The ejector includes a venturi tube, a mixing chamber, and a secondary flow element, wherein the secondary flow element includes a first duct and a bypass duct. The venturi tube has a first fluidic inlet that is proximal to the injector nozzle, and a second fluidic inlet that is downstream from the injector nozzle of the venturi tube. The first duct is fluidly coupled to the first fluidic inlet, and the bypass duct is fluidly coupled to the second fluidic inlet of the venturi tube.

Another aspect of the disclosure may include the second fluidic inlet of the venturi tube being downstream from the injector nozzle in a low-pressure region of the venturi tube.

Another aspect of the disclosure may include the venturi tube defining a first longitudinal axis, and the bypass duct defining a second longitudinal axis, wherein the second longitudinal axis intersects the first longitudinal axis.

Another aspect of the disclosure may include the second longitudinal axis intersecting the first longitudinal axis at an acute angle.

Another aspect of the disclosure may include the acute angle being an acute angle that is less than 45°.

Another aspect of the disclosure may include the acute angle being an acute angle that is greater than 45°.

Another aspect of the disclosure may include a first fluidic flow vector being defined parallel to a first longitudinal axis of the venturi tube, a second fluidic flow vector being defined parallel to the second longitudinal axis of the bypass duct, and the second fluidic flow vector merging with the first fluidic flow vector at an acute angle in a low-pressure region of the venturi tube.

Another aspect of the disclosure may include the secondary flow element being fluidly coupled to an anode of the fuel cell stack to recycle hydrogen.

Another aspect of the disclosure may include the ejector being fluidly coupled to the anode of the fuel cell stack.

Another aspect of the disclosure may include a fuel delivery system for a fuel cell system that includes a jet pump including a plurality of injectors, wherein each of the plurality of injectors includes an injector nozzle and an ejector. The ejector has a venturi tube and a mixing chamber. The venturi tube has a first fluidic inlet that is proximal to the injector nozzle, and a second fluidic inlet that is downstream from the injector nozzle in a low-pressure region of the venturi tube. A fuel recycling element includes a first duct and a bypass duct. The first duct is fluidly coupled to the first fluidic inlet, and the bypass duct is fluidly coupled to the second fluidic inlet in the low-pressure region of the venturi tube.

Another aspect of the disclosure may include a method for delivering hydrogen into an anode of a fuel cell stack that includes injecting, via an injector, pressurized hydrogen into an ejector having a mixing chamber and a venturi tube; injecting, via a first duct, a first recycled portion of hydrogen into the mixing chamber; and injecting, via a second duct, a second recycled portion of hydrogen into a low-pressure portion of the venturi tube downstream of the mixing chamber.

Another aspect of the disclosure may include the injector having an injector nozzle and an ejector, wherein the ejector has the mixing chamber and a venturi tube. Injecting the first recycled portion of hydrogen into the mixing chamber includes drawing the first recycled portion of hydrogen into the mixing chamber via a pressure differential.

Another aspect of the disclosure may include a first fluidic flow vector being defined parallel to a first longitudinal axis of the venturi tube, and a second fluidic flow vector being defined parallel to the second longitudinal axis of the bypass duct. Injecting, via the second duct, a second recycled portion of hydrogen into the low-pressure portion of the venturi tube downstream of the mixing chamber includes merging the second fluidic flow vector with the first fluidic flow vector at an acute angle in the low-pressure region of the venturi tube.

The above features and advantages, and other features and advantages, of the present teachings are readily apparent from the following detailed description of some embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely illustrative in nature and is not intended to limit the application and uses. Furthermore, there is no intention to be bound by expressed or implied theories presented herein. Throughout the drawings, corresponding reference numerals indicate like or corresponding parts and features. As used herein, the term "system" may refer to combinations or collections of mechanical and electrical hardware, software, firmware, electronic control component, processing logic, and/or processor device, individually or in combination, including without limitation: application specific integrated circuit (ASIC), an electronic circuit, a processor (shared, dedicated, or group) that executes one or more software or firmware programs, memory to contain software or firmware instructions, a combinational logic circuit, and/or other suitable components that provide the described functionality.

Certain embodiments may be described herein in terms of functional and/or logical block components and various processing steps. It should be appreciated that such block components may be realized by a combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. Many alternative or additional functional relationships or physical connections may be present in one or more embodiments. As employed herein, the term "upstream" and related terms refer to elements that are towards an origination of a flow stream relative to an indicated location, and the term "downstream" and related terms refer to elements that are away from an origination of a flow stream relative to an indicated location.

The concepts set forth herein are described in context of a fuel cell system that employs hydrogen as a fuel. It is appreciated that the concepts set forth herein may apply to fuel cell systems arranged as described herein that employ fuel other than hydrogen.

Figure 1:
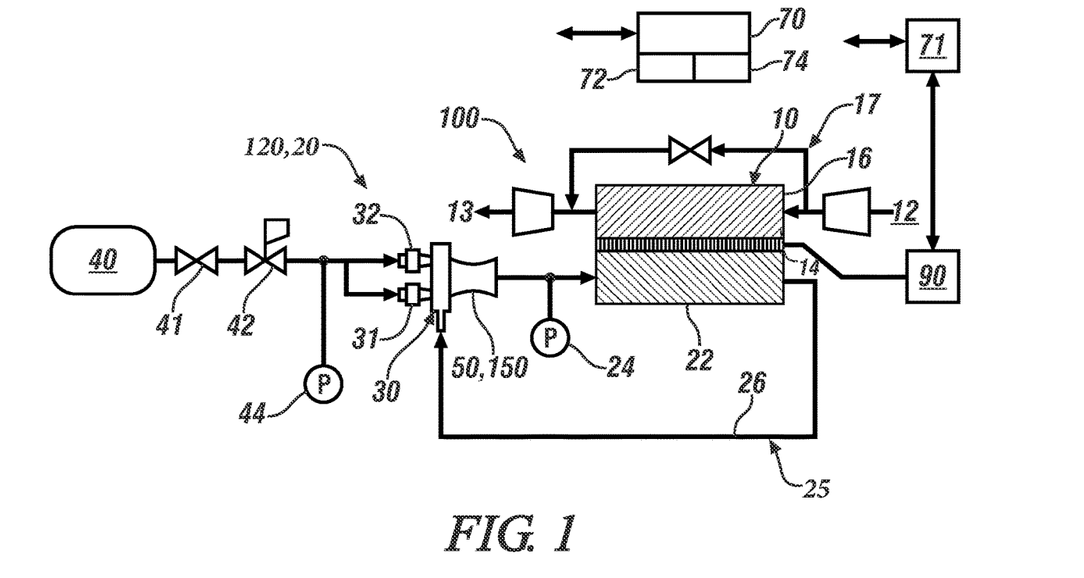
FIG. 1 schematically illustrates a fuel cell system and an electrical machine, in accordance with the disclosure.

FIG. 1, consistent with embodiments disclosed herein, schematically illustrates a fuel cell system 100 that connects to an electrical machine 90, wherein the fuel cell system 100 consumes hydrogen to generate electric power that is consumed by the electric machine 90 to perform work, e.g., mechanical work. The fuel cell system 100 includes, in one embodiment, a pressurized fuel source in the form of a fuel tank 40 for storing pressurized hydrogen (or other fuel), a fuel delivery system 20, a fuel cell 10 and a controller 70. The controller 70 includes one or multiple executable control routines for operating the fuel cell system 100. The hydrogen fuel cell 10 operates as a DC power source for the electric machine 90, which may be a rotary electric machine that may be employed on a mobile platform in the form of a commercial vehicle, industrial vehicle, agricultural vehicle, passenger vehicle, aircraft, watercraft, rail-train, all-terrain vehicle, personal movement apparatus, robot and the like to accomplish the purposes of this disclosure.

Alternatively, the fuel cell 10 may be employed as a DC power source for an embodiment of the electric machine 90 that is disposed on a non-vehicular application, such as for stationary power generation, portable power generation, electronics, remote weather station operation, communication centers, and the like.

The fuel cell 10 includes a cathode 16, an anode 22, and an electrolyte 14. The electrolyte 14, e.g., a polymer electrolyte membrane, is disposed between the cathode 16 and the anode 22. Further, the fuel cell 10 may be formed from one or more membrane electrode assemblies (MEA) that include the cathode 16, anode 22, a plurality of flow plates (not shown), a catalyst (not shown) and a plurality of gas diffusion layers.

The fuel delivery system 20 includes a jet pump 30 that fluidly couples to the anode 22 of the fuel cell 10, and a hydrogen recycling system 25.

The jet pump 30 includes, in one embodiment, first and second hydrogen injectors 31, 32, respectively, and an ejector 50. The first and second injectors 31, 32 are individually controllable to supply pressurized hydrogen from the hydrogen tank 40 to the inlet of the anode 22 via the ejector 50. Alternatively, the jet pump 30 may include three or more injectors that are individually controllable to supply pressurized hydrogen to the inlet of the anode 22 from the hydrogen tank 40. Details related to embodiments of the ejector 50 are described herein with reference to FIGS. 2 and 4.

The first and second injectors 31, 32 are individually controllable to channel pressurized hydrogen from the hydrogen tank 40 to the inlet of the anode 22 via the ejector 50.

The ejector 50 is arranged to controllably supply pressurized hydrogen to an inlet of the anode 22 from the hydrogen tank 40, and also supply hydrogen that is being recycled from the anode 22 via a fluidic conduit 26 of the hydrogen recycling system 25. The fluidic conduit 26 is fluidly coupled between an outlet of the anode 22 and the jet pump 30.

A first pressure sensor 24 is arranged to monitor pressure in a supply line disposed between the jet pump 30 and the anode 22. A second pressure sensor 44 is disposed in a supply conduit between the hydrogen tank 40 and the jet pump 30, and is arranged to monitor injector supply pressure. A flow regulator 42 and a valve 41 are also disposed in the supply conduit for control and monitoring. The fuel cell 10 also includes an air supply system 17 that includes an air inlet 12 and an exhaust 13, and is arranged to supply and control airflow to the cathode 16 of the fuel cell 10.

The controller 70 is arranged to monitor inputs from the first and second pressure sensors 24, 44 and control operations of the first and second hydrogen injectors 31, 32. The controller 70 may be arranged to monitor the electric machine 90, either directly or via communication with a second controller 71 that is arranged to monitor and control the electric machine 90. Alternatively or in addition, the second controller 71 may be arranged to communicate with a device that is capable of human-machine interface, such as an in-vehicle screen, a hand-held device, etc.

During operation, chemical energy from an electrochemical reaction of hydrogen ($H_2$) and oxygen ($O_2$) may transform to electrical energy in the fuel cell 10. In particular, hydrogen gas ($H_2$) may enter the anode 22 and be catalytically split into protons ($H^+$) and electrons ($e^-$) at a catalyst of the anode 22. The protons ($H^+$) may permeate through the electrolyte 14 to the cathode 16, while the electrons ($e^-$) may not permeate the electrolyte 14 but may instead travel along an external load circuit to the cathode 16 to produce a fuel cell power output or electrical current, which is supplied to the electric machine 90. Concurrently, air, e.g., oxygen ($O_2$) and nitrogen ($N_2$), may enter the cathode 16, react with the protons ($H^+$) permeating through the electrolyte 14 and the electrons ($e^-$) arriving to the cathode 16 from the electric machine 90, and form a byproduct such as water ($H_2O$) and heat. The heat may be expelled through the exhaust 13 of the fuel cell 10. The water ($H_2O$) may travel through the electrolyte 14 to the anode 22 and may be collected in a sump.

Referring again to FIG. 1, the system and device include the fuel cell 10 and the electric machine 90 that is electrically connected to the fuel cell 10. Non-limiting examples of the electric machine 90 may include a permanent magnet direct current motor, an alternating current motor, a direct current generator, an alternating current generator, an Eddy current clutch, an Eddy current brake, a rotary converter, a hysteresis dynamometer, a transformer, and the like. For example, the electric machine 90 may be an electric traction motor for a device having an at least partially-electric drivetrain. Motor torque generated by the electric machine 90 may be used to propel a vehicle, start an internal combustion engine, and/or perform other electro-mechanical functions.

In order to perform assigned functions, the controller 70 includes processor 72 and memory 74. The memory 74 may include one or multiple executable instruction sets for monitoring and controlling operation of the fuel cell 10 and the electric machine 90.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit (s), central processing unit(s), e.g., microprocessor(s) and associated non-transitory memory component(s) in the form of a high-speed clock and memory/storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

Figure 3:
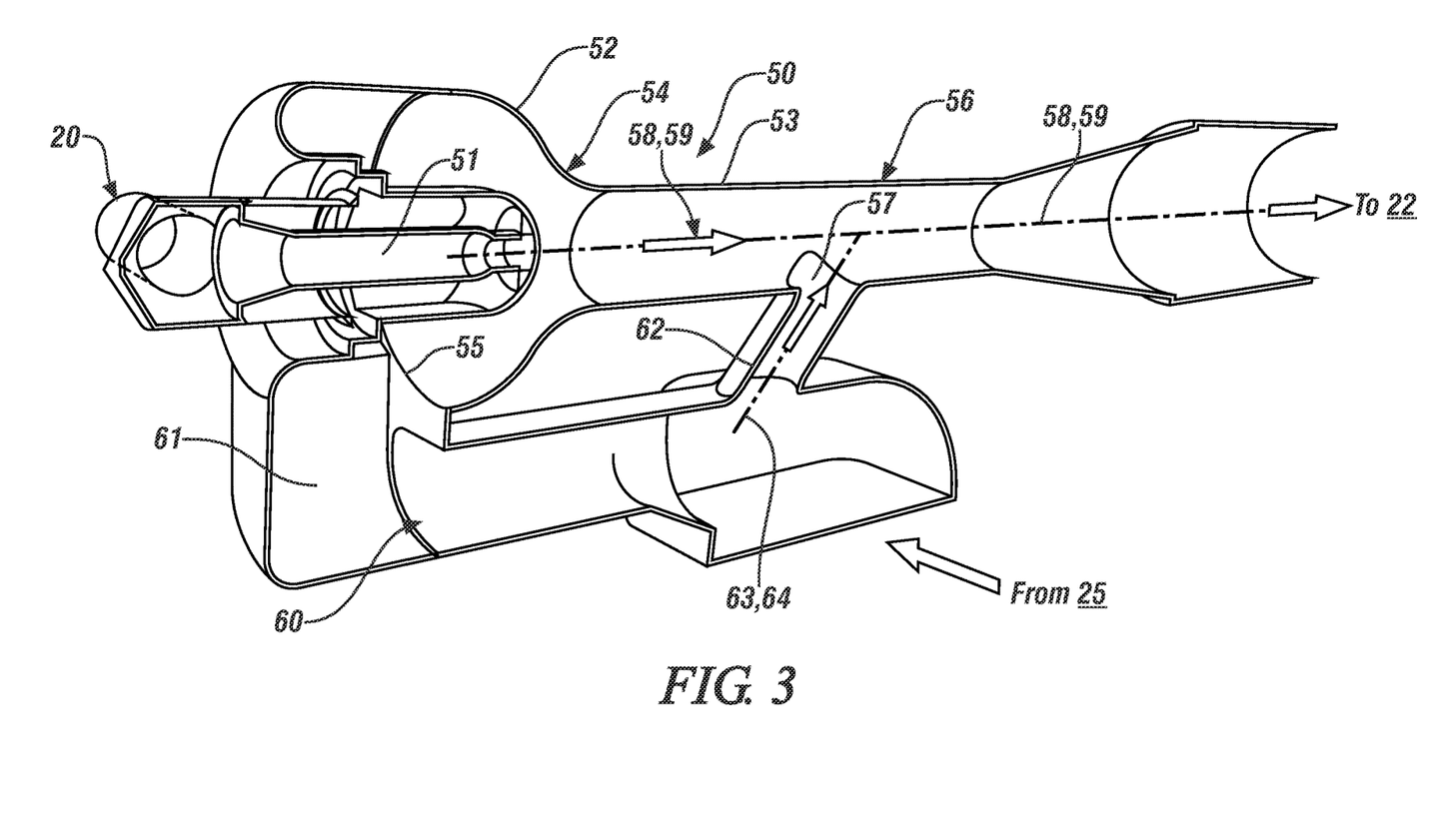
FIG. 3 schematically illustrates a cutaway isometric view of an embodiment of an ejector for a jet pump for a fuel cell system, in accordance with the disclosure.

FIG. 3 schematically illustrates an embodiment of the fuel delivery system 20 for delivering fuel, e.g., hydrogen, to a fuel cell system, in the form of an embodiment of the ejector 50 for the jet pump 30 for the fuel cell system 100 that is described with reference to FIG. 1.

The ejector 50 includes injector nozzle 51 and mixing chamber 52 that are fluidly coupled to a cylindrically shaped venturi tube 53, and a hydrogen recycling element 60 that is fluidly coupled to the fluidic conduit 26 of the hydrogen recycling system 25.

The venturi tube 53 has a high-pressure region 54 and a low-pressure region 56. The injector nozzle 51 and mixing chamber 52 define a first longitudinal flow axis 58. The venturi tube 53 has a first fluidic inlet 55 that is proximal to the injector nozzle 51, and a second fluidic inlet 57 that is downstream from the injector nozzle 51 in the low-pressure region 56 of the venturi tube 53.

The hydrogen recycling element 60 is fluidly coupled to the anode 22 via the fluidic conduit 26 of the hydrogen recycling system 25 to enable recycling of unused hydrogen from the anode 22 to the ejector 50. The hydrogen recycling element 60 includes a first duct 61 and a bypass duct 62. The first duct 61 of the hydrogen recycling element 60 is fluidly coupled to the first fluidic inlet 55 of the venturi tube 53. In this embodiment, the hydrogen recycling element 60 includes multiple 90° elbows to accommodate packaging constraints. The bypass duct 62 is fluidly coupled to the second fluidic inlet 57 in the low-pressure region 56 of the venturi tube 53. The bypass duct 62 defines a second longitudinal flow axis 63. The second longitudinal flow axis 63 intersects the first longitudinal flow axis 58. In one embodiment, the second longitudinal flow axis 63 intersects the first longitudinal flow axis 58 at a first acute angle 65, which is greater than 45 degrees.

A first fluidic flow vector 59 is defined as being parallel to the first longitudinal flow axis 58 of the venturi tube 53, and a second fluidic flow vector 64 is defined parallel to the second longitudinal flow axis 63 of the bypass duct 62. The second fluidic flow vector 64 merges with the first fluidic flow vector 59 at the first acute angle 65 in the low-pressure region 56 of the venturi tube 53.

In this manner, the ejector 50 for the jet pump 30 is able to introduce recycled hydrogen at the first fluidic inlet 55 and also at the second fluidic inlet 57. This arrangement of introducing the recycled hydrogen into the injector 50 at the first fluidic inlet 55 and also at the second fluidic inlet 57 serves to increase entrainment of the recycled hydrogen as compared to current ejector designs, as illustrated and described with reference to FIG. 2.

Figure 4:
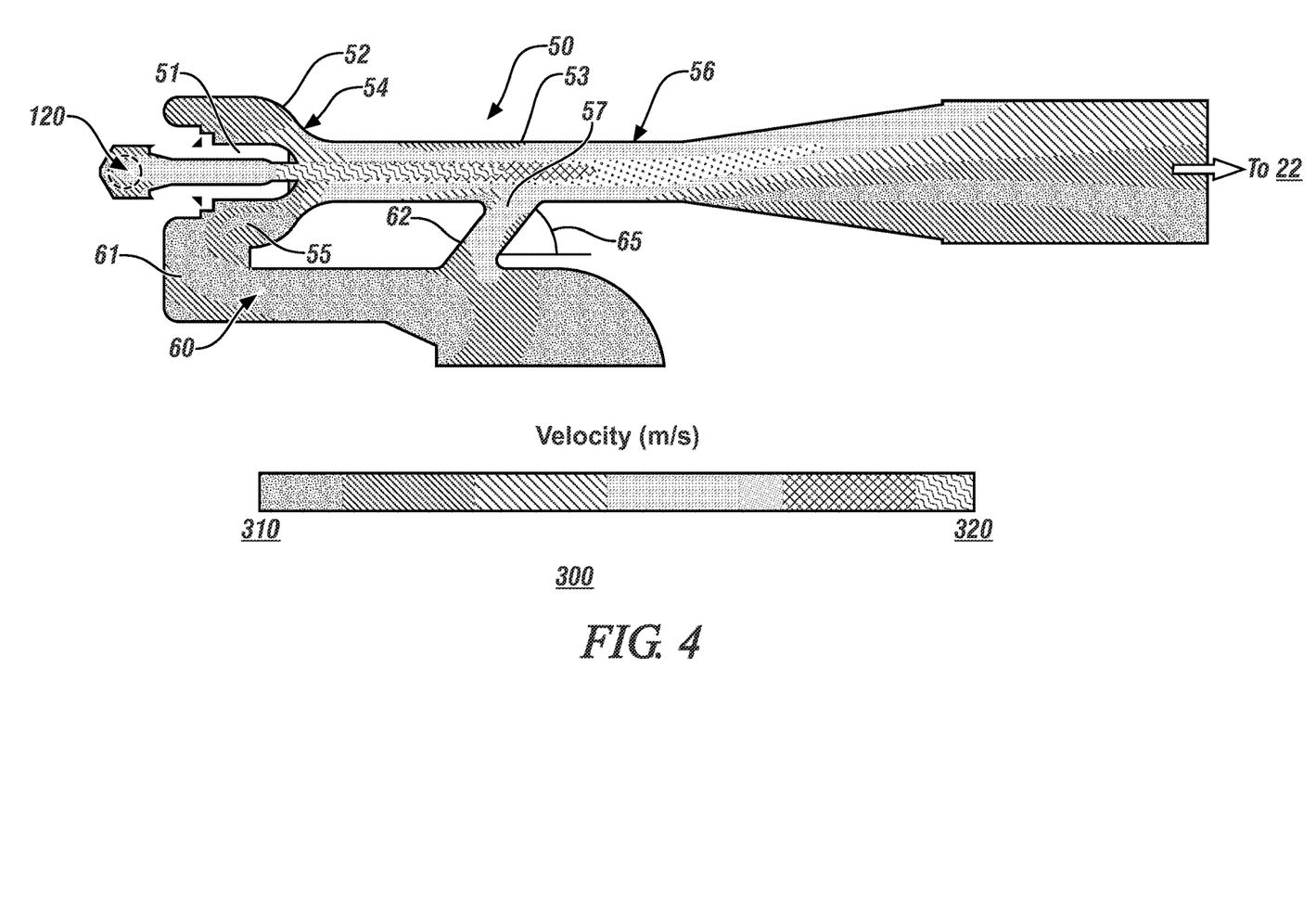
FIG. 4 pictorially illustrates a cutaway side view of the ejector for the jet pump that is described with reference to FIG. 2, including a pictorial depiction of fuel flow therein, in accordance with the disclosure.

FIG. 4 pictorially illustrates a cutaway side view of the ejector 50 for the jet pump 30 that is described with reference to FIG. 3, including a pictorial depiction of fuel flow 300 therein, in accordance with the disclosure. The fuel flow 300 includes a range between a minimum flow 310 and a maximum flow 320, and is depicted by a scale. The pictorial depiction of fuel flow 300 indicates that recycled fuel flow occurs through the first duct 61 and the second or bypass duct 62 without interfering with the primary flow from the injector nozzle 51 through the venturi tube 53.

Figure 5:
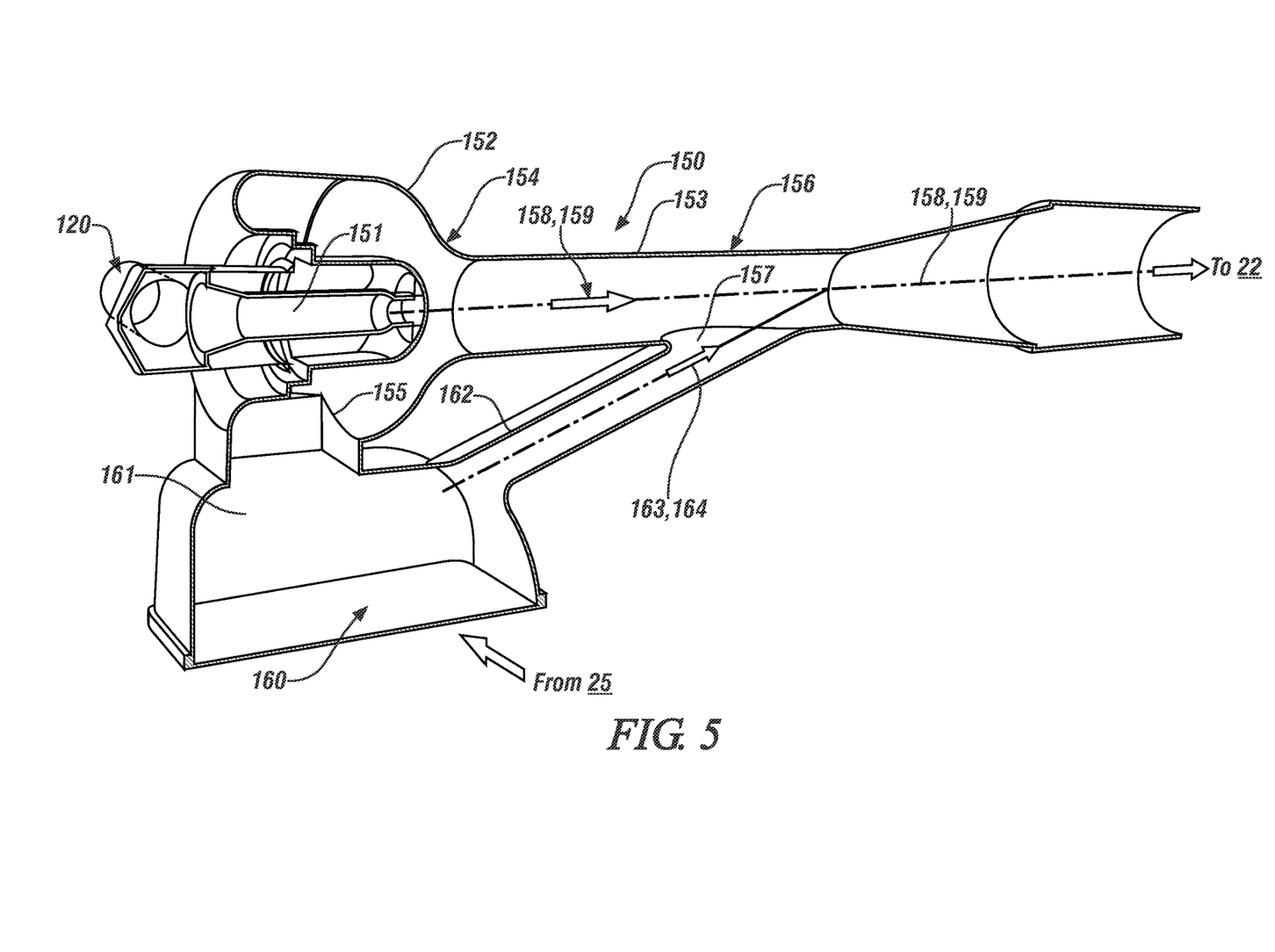
FIG. 5 schematically illustrates a cutaway isometric view of another embodiment of an ejector for a jet pump for a fuel cell system, in accordance with the disclosure.

FIG. 5 schematically illustrates an embodiment of the fuel delivery system 120 for the fuel cell system 100, in the form of another embodiment of ejector 150 for the fuel cell system 100 that is described with reference to FIG. 1.

The ejector 150 includes injector nozzle 151 and mixing chamber 152 that are fluidly coupled to a cylindrically shaped venturi tube 153, and a hydrogen recycling element 160 that is fluidly coupled to the fluidic conduit 26 of the hydrogen recycling system 25.

The venturi tube 153 has a high-pressure region 154 and a low-pressure region 156. The injector nozzle 151 and mixing chamber 152 define a first longitudinal flow axis 158. The venturi tube 153 has a first fluidic inlet 155 that is proximal to the injector nozzle 151, and a second fluidic inlet 157 that is downstream from the injector nozzle 151 in the low-pressure region 156 of the venturi tube 153.

The hydrogen recycling element 160 is fluidly coupled to the anode 22 via the fluidic conduit 26 of the hydrogen recycling system 25 to enable recycling of unused hydrogen from the anode 22 to the ejector 150. The hydrogen recycling element 160 includes a first duct 161 and a bypass duct 162. The first duct 161 of the hydrogen recycling element 160 is fluidly coupled to the first fluidic inlet 155 of the venturi tube 153. The bypass duct 162 is fluidly coupled to the second fluidic inlet 157 in the low-pressure region 156 of the venturi tube 153. The bypass duct 162 defines a second longitudinal flow axis 163. The second longitudinal flow axis 163 intersects the first longitudinal flow axis 158. In one embodiment, the second longitudinal flow axis 163 intersects the first longitudinal flow axis 158 at a first acute angle 165, which is less than 45 degrees.

A first fluidic flow vector 159 is defined as being parallel to the first longitudinal flow axis 158 of the venturi tube 153, and a second fluidic flow vector 164 is defined parallel to the second longitudinal flow axis 163 of the bypass duct 162. The second fluidic flow vector 164 merges with the first fluidic flow vector 159 at the first acute angle 165 in the low-pressure region 156 of the venturi tube 153.

In this manner, the ejector 150 for the jet pump 30 is able to introduce recycled hydrogen into the ejector 150 at the first fluidic inlet 155 and also at the second fluidic inlet 157. This arrangement of introducing the recycled hydrogen into the ejector 150 at the first fluidic inlet 155 and also at the second fluidic inlet 157 serves to increase entrainment of the recycled hydrogen as compared to current ejector designs, as illustrated and described with reference to FIG. 2.

Figure 6:
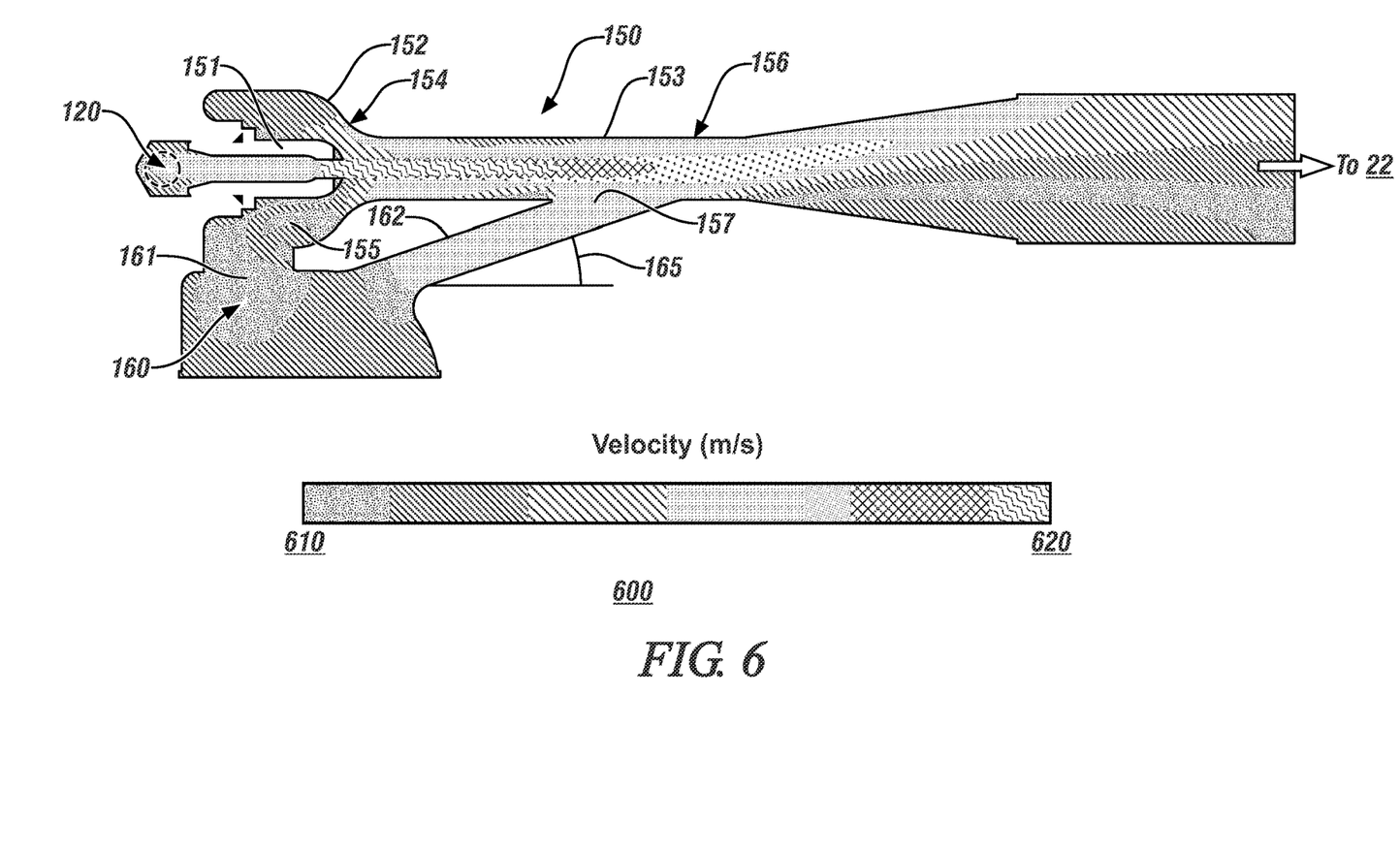
FIG. 6 pictorially illustrates a cutaway side view of the ejector for the jet pump that is described with reference to FIG. 4, including a pictorial depiction of fuel flow therein, in accordance with the disclosure.

FIG. 6 pictorially illustrates a cutaway side view of the ejector 150 for the jet pump 130 that is described with reference to FIG. 5, including a pictorial depiction of fuel flow 300 therein, in accordance with the disclosure. The fuel flow 600 includes a range between a minimum flow 610 and a maximum flow 620, and is depicted by a scale. The pictorial depiction of fuel flow 600 indicates that recycled fuel flow occurs through the first duct 161 and the second or bypass duct 162 without interfering with the primary flow from the injector nozzle 151 through the venturi tube 153.

Figure 2:
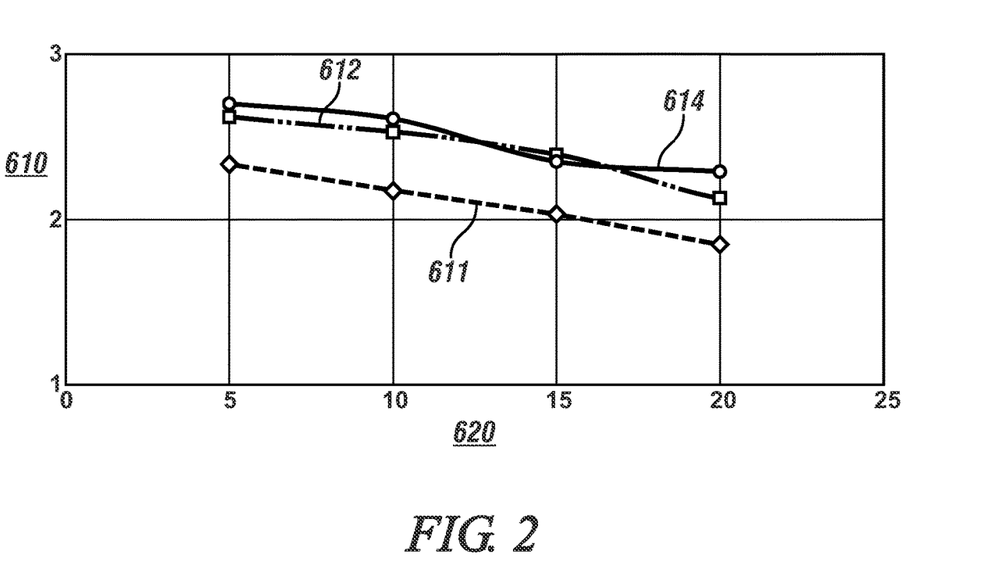
FIG. 2 graphically illustrates parameters related to entrainment for various embodiments of ejectors for a jet pump for a fuel cell system, in accordance with the disclosure.

FIG. 2 graphically illustrates parameters related to entrainment for various embodiments of ejectors for a jet pump for a fuel cell system. An entrainment parameter 610 is indicated on the vertical axis, and a pressure differential 620 is indicated on the horizontal axis. Plotted results include entrainment in relation to pressure differential for a baseline system without a bypass duct (611), entrainment in relation to pressure differential for an embodiment of the ejector 50 described with reference to FIGS. 3 and 4 (612), and entrainment in relation to pressure differential for an embodiment of the ejector 150 described with reference to FIGS. 5 and 6 (614). The results indicate an increase in the entrainment parameter by implementation of the embodiments of the bypass duct that are described with reference to FIGS. 3-6.

The concepts described herein provide an ejector having a primary injector nozzle that delivers pressurized hydrogen fuel to a mixing chamber and a secondary duct that delivers recycled hydrogen to the mixing chamber downstream of the primary injector nozzle employing a bypass pipe that connects the secondary duct to the mixing chamber downstream of the primary injector nozzle. The bypass pipe increases the total mass flow of recycled hydrogen that is delivered to the mixing chamber by allowing additional flow through the bypass pipe that may bypass 90° elbows that may exist in the secondary duct. The bypass pipe provides a net benefit when the secondary duct contains multiple 90° elbows. The angle of the bypass pipe with respect to the mixing chamber is such that the flow enters the mixing chamber with velocity component parallel to flow direction in the mixing chamber. The downstream outlet of the bypass pipe is located in a low-pressure region in the mixing chamber. The concept improves low jet pump/ejector entrainment efficiency as compared to current systems by adding a bypass pipe that branches off the secondary duct. This bypass pipe delivers flow downstream of the primary injector nozzle into a low-pressure region. It results in more flow being sucked into the mixing chamber which increases the overall entrainment efficiency of the jet pump/ejector.

The detailed description and the drawings or figures are supportive and descriptive of the present teachings, but the scope of the present teachings is defined solely by the claims. While some embodiments for carrying out the present teachings have been described in detail, various alternative designs and embodiments exist for practicing the present teachings defined in the appended claims.

What is claimed is:

1. A hydrogen delivery system for a fuel cell system, the hydrogen delivery system comprising:
   a jet pump including an injector nozzle and an ejector, wherein the jet pump is fluidly connected to a fuel cell stack; and wherein the jet pump channels pressurized hydrogen from a hydrogen tank to a fuel cell;
   wherein the ejector includes a venturi tube, a mixing chamber, and a secondary flow element;
   wherein the secondary flow element includes a first duct and a bypass duct;
   wherein the venturi tube has a first fluidic inlet that is proximal to the injector nozzle, and a second fluidic inlet that is downstream from the injector nozzle of the venturi tube;
   wherein the first duct is fluidly coupled to the first fluidic inlet; and
   wherein the bypass duct is fluidly coupled to the second fluidic inlet of the venturi tube.

2. The hydrogen delivery system of claim 1, wherein the second fluidic inlet of the venturi tube is downstream from the injector nozzle in a low-pressure region of the venturi tube.

3. The hydrogen delivery system of claim 2, wherein the venturi tube defines a first longitudinal axis, wherein the bypass duct defines a second longitudinal axis, and wherein the second longitudinal axis intersects the first longitudinal axis.

4. The hydrogen delivery system of claim 3, wherein the second longitudinal axis intersects the first longitudinal axis at an acute angle.

5. The hydrogen delivery system of claim 4, wherein the acute angle is an acute angle that is less than 45°.

6. The hydrogen delivery system of claim 4, wherein the acute angle is an acute angle that is greater than 45°.

7. The hydrogen delivery system of claim 3, wherein a first fluidic flow vector is defined parallel to a first longitudinal axis of the venturi tube, wherein a second fluidic flow vector is defined parallel to the second longitudinal axis of the bypass duct, and wherein the second fluidic flow vector merges with the first fluidic flow vector at an acute angle in the low-pressure region of the venturi tube.

8. The hydrogen delivery system of claim 1, wherein the secondary flow element is fluidly coupled to an anode of the fuel cell stack to recycle hydrogen.

9. The hydrogen delivery system of claim 1, wherein the ejector is fluidly coupled to an anode of the fuel cell stack.

10. A fuel delivery system for a fuel cell system, the fuel delivery system comprising:
    a jet pump including a plurality of injectors, wherein each of the plurality of injectors includes an injector nozzle and an ejector;
    the ejector having a venturi tube and a mixing chamber;
    the venturi tube having a first fluidic inlet that is proximal to the injector nozzle, and a second fluidic inlet that is downstream from the injector nozzle in a low-pressure region of the venturi tube; and
    a fuel recycling element including a first duct and a bypass duct;
    wherein the first duct is fluidly coupled to the first fluidic inlet;
    wherein the jet pump is fluidly connected to a fuel cell stack; and
    wherein the bypass duct is fluidly coupled to the second fluidic inlet in the low-pressure region of the venturi tube.

11. The fuel delivery system of claim 10, wherein the venturi tube defines a first longitudinal axis, wherein the bypass duct defines a second longitudinal axis, and wherein the second longitudinal axis intersects the first longitudinal axis.

12. The fuel delivery system of claim 11, wherein the second longitudinal axis intersects the first longitudinal axis at an acute angle.

13. The fuel delivery system of claim 11, wherein a first fluidic flow vector is defined parallel to a first longitudinal axis of the venturi tube, wherein a second fluidic flow vector is defined parallel to the second longitudinal axis of the bypass duct, and wherein the second fluidic flow vector merges with the first fluidic flow vector at an acute angle in the low-pressure region of the venturi tube.

14. The fuel delivery system of claim 10, wherein the injector nozzle is fluidly coupled to a pressurized fuel source.

15. The fuel delivery system of claim 10, wherein the fuel recycling element is fluidly coupled to an anode of the fuel cell stack to provide a secondary flow of fuel.

16. The fuel delivery system of claim 15, wherein the ejector is fluidly coupled to the anode of the fuel cell stack.

17. A method for delivering hydrogen to an anode of a fuel cell stack, the method comprising:
    injecting, via an injector, pressurized hydrogen into an ejector having a mixing chamber and a venturi tube; and
    injecting, via a first duct, a first recycled portion of hydrogen into the mixing chamber; and
    injecting, via a second duct, a second recycled portion of hydrogen into a low-pressure portion of the venturi tube downstream of the mixing chamber.

18. The method of claim 17, wherein the injector includes an injector nozzle and an ejector, and wherein the ejector has the mixing chamber and a venturi tube; and
    wherein injecting the first recycled portion of hydrogen into the mixing chamber comprises drawing the first recycled portion of hydrogen into the mixing chamber.

19. The method of claim 17, wherein a first fluidic flow vector is defined parallel to a first longitudinal axis of the venturi tube, wherein a second fluidic flow vector is defined parallel to a second longitudinal axis of the second duct, and wherein injecting, via the second duct, a second recycled portion of hydrogen into the low-pressure portion of the venturi tube downstream of the mixing chamber comprises merging the second fluidic flow vector and the first fluidic flow vector at an acute angle in the low-pressure portion of the venturi tube.

20. The method of claim 19, wherein merging the second fluidic flow vector and the first fluidic flow vector at the acute angle in the low-pressure portion of the venturi tube.

\* \* \* \* \*